July 6, 1965
W. T. GANDY
3,193,018
ROTOR HUB ASSEMBLY
Filed Dec. 5, 1962
2 Sheets-Sheet 1
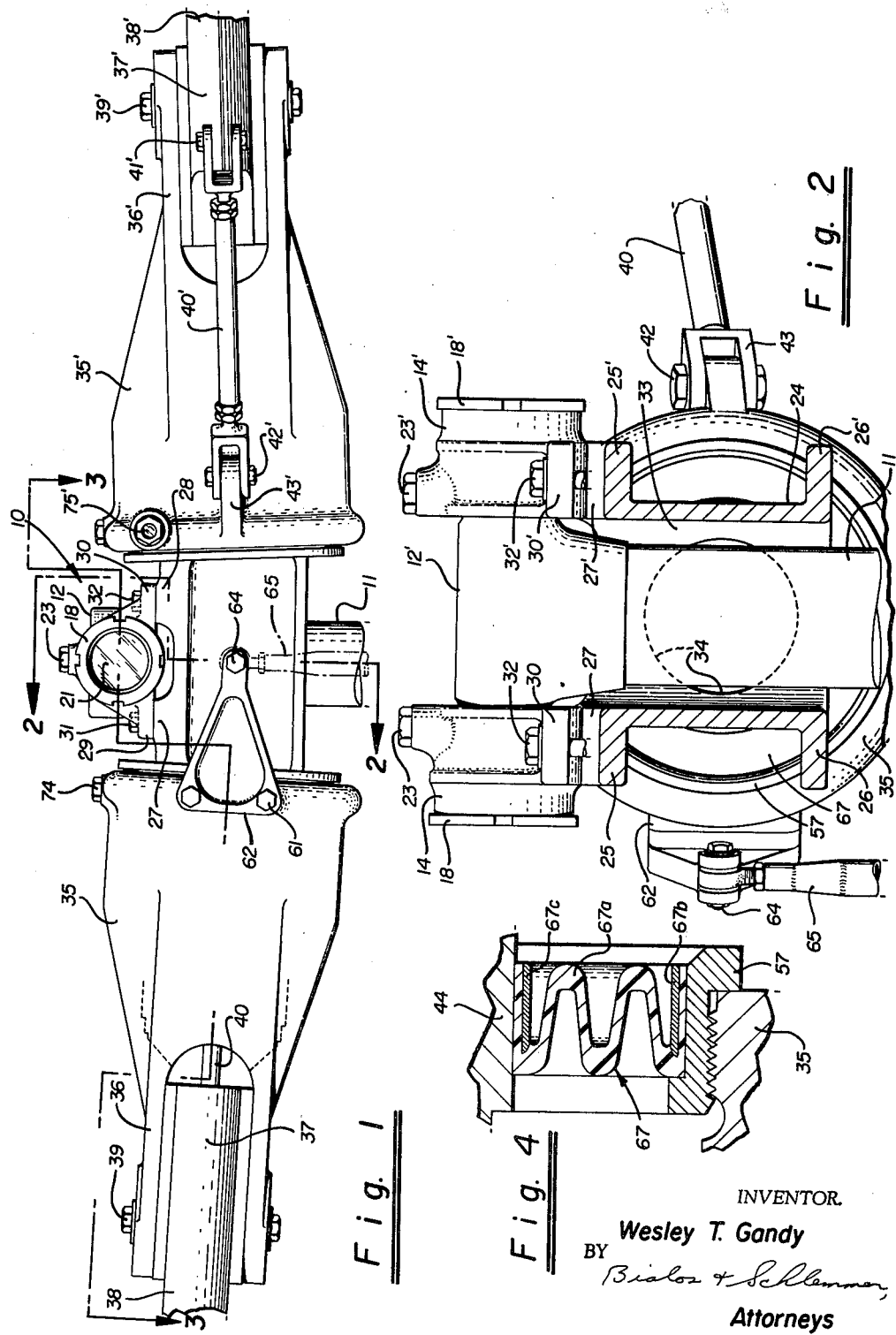
INVENTOR.
Wesley T. Gandy
BY
Bialos & Schlemmer
Attorneys July 6, 1965 W. T. GANDY 3,193,018
ROTOR HUB ASSEMBLY
Filed Dec. 5, 1962 2 Sheets-Sheet 2

INVENTOR.
Wesley T. Gandy
BY Bialos & Schlemmer
Attorneys

United States Patent Office 3,193,018
Patented July 6, 1965

3,193,018
ROTOR HUB ASSEMBLY
Wesley T. Gandy, Palo Alto, Calif., assignor, by mesne assignments, to Hiller Aircraft Company, Inc., Menlo Park, Calif., a corporation of Delaware
Filed Dec. 5, 1962, Ser. No. 242,509
4 Claims. (Cl. 170—160.27)

This invention relates to a rotary wing aircraft, and more particularly to a rotor hub assembly therefor.

In contemporary rotary wing aircraft, the rotor blades or lift wings are respectively supported for pivotal movements or angular displacements about the longitudinal or span-wise axes thereof so that the collective pitch of the blades can be selectively adjusted to control the altitude of the aircraft, and to enable each blade to be continuously featured as it is rotated through an arc of 360° in order to provide the blades with cyclic pitch and thereby determine the direction of travel of the aircraft. One of the difficulties encountered in supporting the rotor blades to accommodate such angular displacements thereof is that upon rotation of the hub assembly, the thrust operative upon the blades as a consequence of centrifugal force is frequently in the order of 30,000 to 50,000 pounds, and centrifugal thrust loads of this magnitude are difficult to accommodate while supporting the blades for relatively free angular displacements about the span-wise axes thereof.

In view of the foregoing, an object of the present invention is to provide an improved hub assembly for a rotary wing aircraft in which such difficulties are materially reduced and substantially obviated.

Another object of the invention is that of providing a rotor hub assembly in which each rotor blade or lift wing is supported for pivotal movements about the longitudinal or span-wise axis thereof, and in which load or thrust-accommodating structure is provided in association with each blade to receive substantially all thrust loads oriented along the longitudinal axis thereof to isolate the journal support for the blade from such loads and thereby permit the blade to be relatively free for angular displacements thereof, whereby only minimum-value control forces are required to adjust the collective and cyclic pitch of all of the blades.

Still another object is in the provision of an improved rotor hub assembly of the character described in which the support means for each rotor blade is defined by a spindle shaft rotatably receiving a blade holder thereon in circumjacent relation therewith—each such blade holder being quickly and easily mountable upon the spindle shaft therefor and positively located with respect thereto so that substantially all loads (i.e., thrust, weight, torque) are imparted to the load-accommodating structure which thereby isolates such loads from the journal support about which the blade holder is angularly displaceable.

A further object of the invention is to provide a rotor blade mounting assembly in which each blade holder is supported upon journal-bearing structure for pivotal movements about a spindle shaft, and in which such blade holder is further related to the spindle shaft by a load-accommodating bearing assembly operative to accept substantially all loading forces—whether thrust forces effective along the span-wise axis of the blade and blade holder, or arcuate forces (that is, torque) tending to rotate the blade holder with respect to the shaft about an axis generally normal to such span-wise axis—to effectively isolate the journal-bearing structure therefrom.

Yet a further object is that of providing a mounting arrangement of the type described in which all of the bearings associated with such rotor blade are respectively mounted within lubrication chambers and are effectively encapsulated in a body of lubricant to protect such bearings and the associated components from oxidation otherwise caused by exposure of such elements to the atmosphere—the centrifugal force developed upon rotation of the rotor assembly being utilized to concentrate the lubricant forces at one location within the chamber and reduce such forces at another location to obviate the development and consequences of lubricant leakage.

Additional objects and advantages of the invention will become apparent as the specification develops.

An embodiment of the invention is illustrated in the accompanying drawings, in which:

FIGURE 1 is a broken side view in elevation of a rotor hub assembly embodying the invention;

FIGURE 2 is an enlarged, transverse sectional view taken generally along the line 2—2 of FIGURE 1;

FIGURE 4 is an enlarged, cross sectional view of one of the seal elements.

Figure 3:
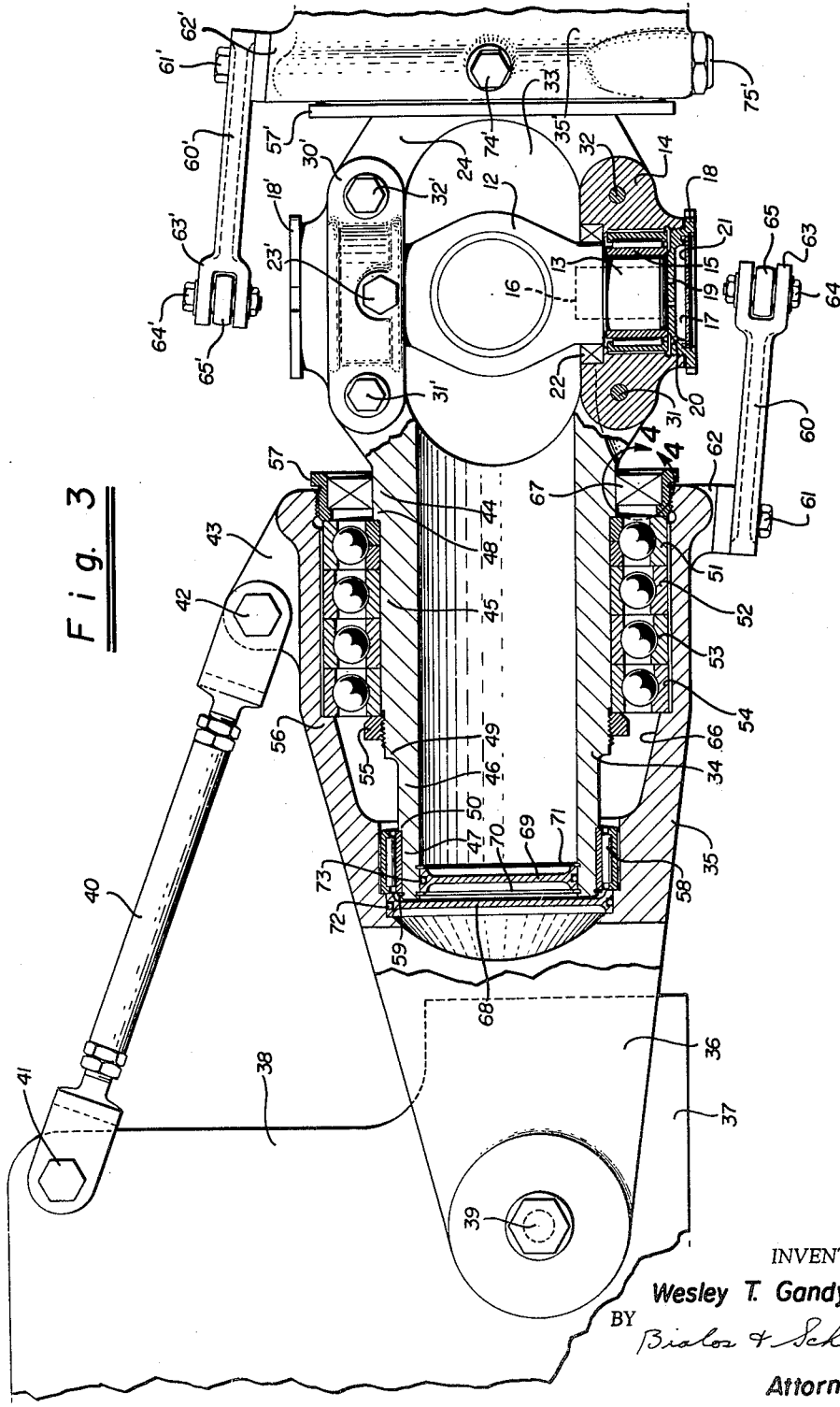
FIGURE 3 is an enlarged, broken longitudinal sectional view taken generally along the line 3—3 of FIGURE 1.

The hub assembly shown in the drawings is designated in its entirety with the numeral 10, and is a teetering-type rotor pivotally or angularly displaceable about a teetering or flapping axis generally normal to the longitudinal axis of a drive shaft or rotor column 11 which is normally oriented in a generally vertical disposition. The shaft 11 is rotatably driven by an engine or prime mover through a suitable transmission (neither of which are shown); and for purposes of the present invention, both the engine and transmission may be regarded as conventional.

The rotor assembly 10 includes a spindle structure 12 that is mounted upon the drive shaft 11, and is splined or otherwise related thereto so as to be rotatably driven thereby. The spindle 12 is equipped with a pair of diametrically oriented and oppositely extending spindles or axles, one of which is illustrated in FIGURE 3 and is denoted with the numeral 13. Coaxially circumjacent the spindle 13 is a collar 14 supported for pivotal movement with respect thereto upon anti-friction journal structure in the form of roller bearings 15—the inner race of which engages the spindle, and the outer race of which engages the collar.

The bearing assembly 15 is mounted within a chamber or compartment defined in part by the spindle 13 and coaxially circumjacent collar 14, and in part by a bore 16 formed in the spindle 13 and an open space 17 provided in a sight-gauge 18 that serves as a plug threadedly received within the tapped outer end portion of the collar 14. The space 17 communicates with the bore 16 through a plurality of openings 19 formed in the inner wall of the sight-gauge, and the space 17 also communicates with that portion of the chamber receiving the bearing assembly 15 through a plurality of apertures or ports 20 oriented about the threaded peripheral portion of the sight-gauge. The sight-gauge 18 is provided with a transparent viewing window 21; and since the chamber is adapted to contain a lubricant, the quantity thereof within the chamber is readily determined by visual inspection through the window 21.

At its inner end, the chamber is closed by a seal 22 that extends between the collar 14 and inner end portion of the spindle 13 to sealingly interrelate the same, but which permits pivotal or angular displacements of the collar 14 with respect to the spindle. The lubricant compartment at its outer end terminates in closure structure that includes the window 21, the outer surface of the collar 14 and facing surface of the sight-gauge 18, and a gasket or seal interposed therebetween. Such elements of the closure structure are rigidly related to the components in association therewith so that no relative movement occurs therebetween along the sealingly engaged surfaces thereof. The lubrication chamber is filled through an appropriate opening in communication therewith provided through the collar 14, and the opening is equipped with a threaded closure plug 23.

The rotor hub assembly is symmetrical about the spin axis or longitudinal axis of the drive shaft 11 as concerns the spindle structure 12; and, therefore, the equivalent structural composition of a spindle, collar and associated components is provided at the opposite end portion of the spindle structure, as is most apparent in FIGURE 2. For purposes of identification, the respectively corresponding elements are designated with the primed form of the same numerals, and no further description thereof is necessary.

Depending from the collars 14 and 14' and rigidly interconnecting the same is a hanger 24 of generally U-shaped cross section which provides an outwardly extending upper flange 25 and a lower flange 26 on one side thereof, and respectively corresponding upper and lower flanges 25' and 26' along the opposite side thereof. As shown best in FIGURE 1, the upper flange 25 has enlarged areas or bosses 27 and 28 respectively aligned with oppositely extending, longitudinally spaced ears 29 and 30 provided by the collar 14, and such ears are respectively secured to the hanger and bosses thereof by bolts 31 and 32. Similarly, the collar 14' is equipped with oppositely extending, longitudinally spaced ears that are respectively secured to the hanger by bolts; and the primed form of the same numerals is again used to identify corresponding parts.

The hanger 24 has a longitudinally elongated, large central opening 33 therein that permits the hanger to pivot through a substantial arc relative to the rotor column or drive shaft 11 about the teetering or flapping axis defined by the two spindles comprised by the spindle structure 12 and which respectively support the collars 14 and 14' thereon for such pivotal movement. The flapping or teetering motion of the rotor hub assembly may be in the order of 10° in either direction with reference to the spin axis or longitudinal axis of the drive shaft 11, and usually stop structure (not shown) will be provided to suitably limit the extent of the teetering displacement of the hub assembly. Formed integrally with the hanger 24 and extending outwardly therefrom in opposite directions are a pair of diametrically oriented, tubular journals or spindle shafts—one of which is shown in FIGURE 3 and is denoted with the numeral 34.

Coaxially circumjacent the spindle shaft 34 is a hub component or blade holder 35 equipped with a bifurcated end portion 36 that receives therein the root end 37 of a rotor blade or lift wing 38. The blade 38 is secured to the blade holder 35 by a pin or bolt 39 that extends through the end 37 of the blade and through the bifurcated end portion 36 of the blade holder. The blade 38 is anchored to the holder 35 to prevent relative pivotal movement therebetween by a drag link 40 secured at one end thereof to the wing 38 by a bolt 41, and secured at its other end by a bolt 42 to a boss or enlargement 43 provided by the blade holder 35. The length of the drag link 40 is selectively adjustable to permit the blade 38 to be properly aligned with respect to the rotor hub assembly.

The outer surface of the spindle shaft 34 has a plurality of stepped sections 44, 45, 46 and 47 respectively defining shoulders 48, 49 and 50 therebetween. Mounted upon the stepped section 45 is a load or thrust-accommodating assembly comprising a plurality of ball bearing compositions respectively designated with the numerals 51, 52, 53 and 54. The inner race of the bearing 51 is oriented in abutment with the shoulder 48, and is constrained thereagainst by a nut 55 through the intermediate agency of the inner races of the bearings 51, 52, 53 and 54. The nut 55 is received upon the threaded end portion of the stepped section 45 located adjacent the shoulder 49, and bears against the inner race of the bearing 54. The inner race of the bearing 51 is split, as shown in FIGURE 3, to accommodate the adjusting force or thrust of the nut 55 and permit proper disposition and alignment of the bearing compositions with respect to the spindle shaft 34 and blade holder 35.

The blade holder 35 receives the outer races of the bearings therein and is provided with a shoulder 56 that abuts the outer race of the bearing 54. The blade holder 35 is drawn into the assembled position shown in FIGURE 3 and maintained thereat by a nut 57 coaxial with the spindle shaft 34 at the inner end thereof and threadedly engaging the tapped inner end portion of the blade holder 35. The nut 57 at its inner end bears against the outer race of the bearing 51. Consequently, the blade holder is positively oriented along the spindle shaft 34, and is constrained against axial displacements with respect thereto in one direction by engagement of the shoulder 56 with the outer race of the bearing 54 and in the opposite direction by engagement of the nut 57 with the outer race of the bearing 51.

The blade holder 35 is supported for pivotal or angular displacements about the spindle shaft 34 upon journal structure in the form of a roller bearing assembly 58—the inner race of which is held in abutment with the shoulder 50 of the spindle shaft 34 by a retaining ring 59. The outer race of the bearing 58 is engaged by the circumjacent surface of the blade holder 35. Thus, the blade holder is journaled for rotation about the spindle shaft 34 on the journal bearing assembly 58, and angular displacements of the blade holder are enforced thereon by an incidence arm 60 rigidly secured at one end thereof by bolts 61 to a bracket 62 rigidly related to the blade holder 35. The opposite end of the incidence arm is bifurcated (as shown at 63), and is pivotally connected thereat by a pin or bolt 64 to a rod or link 65 adapted to be displaced along the length thereof by suitable cyclic and collective pitch control mechanism as, for example, the wobble plate composition illustrated and described in Patent No. 2,534,353.

The spindle shaft 34 and coaxially circumjacent blade holder 35 define a lubrication chamber or compartment 66 therebetween which is closed at the inner end thereof by a seal 67 that may be in the form of a flexible, convoluted diaphragm 67a anchored in place by concentric clamp rings 67b and 67c (the seal element 22 heretofore described may be of the same type). The seal element 67 is sealingly related to the spindle shaft and more particularly the stepped section 44 thereof, by the clamp ring 67c and to the nut 57 by the clamp ring 67b. However, since the nut 57 is rigid with the blade holder 35, the seal element 67 effectively extends between the spindle shaft and blade holder and sealingly relates the same while permitting relative angular displacements therebetween.

The opposite end of the chamber 66 terminates in closure structure comprising a metal diaphragm 68 rigidly related to the blade holder 35 so that no relative movement occurs therebetween, and also comprising a metal diaphragm 69 rigidly related to the spindle shaft 34 by retaining rings 70 and 71 so that no relative movement occurs between the diaphragm and spindle shaft. The outer circumferential surfaces of the diaphragms 68 and 69 may be recessed to respectively receive O-rings 72 and 73 therein.

The compartment or chamber 66 is filled with a lubricant through a suitable opening provided therefor in the blade holder 35, and such opening is closed by a threaded plug 74, as shown in FIGURE 1. The quantity of lubricant contained within the chamber 66 is readily determined by visual inspection through a sight-gauge—such a sight-gauge being shown in FIGURES 1 and 3 in association with the blade holder 35' and is denoted with the numeral 75'. The details of the sight-gauge 75', further details concerning the sight-gauges 18 and 18', and a detailed discussion of the seals and closure structures associated with the various lubrication chambers, as well as the action of centrifugal force upon the lubricant contained within the chambers and the beneficial effects of encapsulating the various bearings and associated components in a body of lubricant, are not set forth in that they do not per se constitute a part of this invention.

It will be apparent (as is most evident in FIGURE 1) that the rotor hub assembly comprises two rotor blades or lift wings, blade holders, spindle shafts and associated components; and it should be understood that the foregoing description applies equally to each such structural composition, and the correspondence of components is indicated by the primed form of the same numerals applied wherever appropriate. The two spindle shafts as heretofore indicated define the span-wise or longitudinal axes of the rotor blades; such axes being substantially coincident and generally normal to the spin axis or longitudinal axis of the drive shaft 11, and angularly offset from the teetering axis by substantially 90°.

To assemble the apparatus, the collars 14 and 14' are mounted upon the respective spindles provided by the spindle structure 12, and the hanger 24 is rigidly secured to the collars by the bolts 31–32 and 31'–32'. Considering assembly of the spindle shaft 34 and blade holder 35, the nut 57 and seal 67 will first be located upon the spindle shaft. Then the various bearing compositions 51 through 54 are positioned upon the stepped section 45 of the spindle shaft, and the nut 55 is threaded onto the end portion of such section to constrain the bearing compositions upon the section 45 with the inner race of the bearing 51 abutting the shoulder 48 of the spindle shaft. The journal bearing 58 is then mounted upon the stepped section 47 of the spindle shaft, and is constrained thereon by the retaining ring 59 with the inner race of the bearing being in substantial abutment with the shoulder 50 of the spindle shaft. The diaphragms 68 and 69 are respectively secured to the blade holder 35 and spindle shaft 34 prior to the assembly of these two components, and may be mounted at any appropriate time during manufacture since they are permanent or semi-permanent elements.

Next, the blade holder 35 is telescoped over the spindle shaft 34, and is secured in the position shown in FIGURE 4 by the nut 57, and the seal 67 is then secured in position. The incidence arm 60 can be connected to the blade holder 35 and linkage 65 at any suitable time, generally before the rotor blade is connected to the blade holder. It will be apparent that the blade holder 35' is similarly mounted upon its associated spindle shaft; and the lubrication compartments associated with the respective blade holders will be filled with a lubricant through the plug-equipped filler openings thereof. The rotor blades are then connected to their respectively associated blade holders, and the drag links fastened thereto and adjusted in length as necessary to properly align the blades.

In a static condition of the rotor assembly, the weight of each blade acting on the blade holder imparts a bending moment thereto tending to rotate the same about an axis extending generally through the journal bearing 58 and generally normal to the longitudinal axis of the spindle shaft. Such bending movement—the length of the lever arm thereof being approximately equivalent to the distance between the center of the bearing 58 and center of gravity of the blade 38—is resisted by the lever system comprising the thrust bearing assembly, the length of the lever arm thereof being approximately equal to the distance between the center of the bearing assembly 58 and center of the thrust bearing assembly (which may be taken to be generally along the plane of contact of the bearing compositions 52 and 53. Consequently, this significant bending movement is effectively counteracted by the thrust bearing assembly, with the result that substantially no torque or arcuate forces from this source need be resisted by the journal bearing 58.

An analogous relationship exists upon rotation of the rotor assembly with respect to the driving torque transmitted to the blade 38 through the spindle shaft 34. This torque tends to enforce relative rotation between the spindle shaft 34 and blade holder 35 about an axis extending generally through the bearing 58, normal to the longitudinal axis of the spindle shaft and offset by approximately 90° from the aforementioned axis of the bending moment caused by the weight of the blade at static conditions of the rotor assembly. The bending moment resulting from such transmission of torque is resisted by the thrust bearing assembly comprising the bearing compositions 51 through 54; and therefore, substantially no torque or angular forces need be resisted by the journal bearing assembly 58.

As the hub is rotated, the resultant centrifugal force operative upon the rotor blade 38 tends to counteract the weight thereof, thereby relieving the bending moment imparted to the blade holder and spindle shaft as a result of the blade weight when the rotor is at rest. However, the centrifugal force imparts an outwardly directed thrust to the blade holder 35, which is resisted by the thrust bearing assembly and is transferred thereby to the spindle shaft 34. As a consequence, substantially no axially directed thrust forces are transmitted to the journal bearing assembly 58. Therefore, the bearing assembly 58 defines essentially a pure journal supporting the blade holder 35 for pivotal movements or angular displacements about the axis of the spindle shaft 34, and the control forces necessary to effect such angular displacements are materially minimized.

The various lubrication compartments are maintained in a completely filled condition, which is generally determined by visual inspection through the respectively associated sight-gauges; and as a result, the bearing assemblies and associated wear surfaces are encapsulated in a body of lubricant and are thereby continuously protected from the oxidizing effects of the atmosphere. Moreover, upon rotation of the rotor assembly, the centrifugal forces developed in each such body of lubricant tend to displace the same outwardly, thereby relieving fluid pressures on the relatively weak and leakage-susceptible seals (22 and 67) and concentrating such pressures against the much stronger leakage-resistant closure structures (the diaphragms 68 and 69, for example) whereat no relative movement occurs between the sealing surfaces thereof and the surfaces respectively engaged thereby.

While in the foregoing specification and embodiment of the invention has been set forth in considerable detail for purposes of making an adequate disclosure thereof, it will be apparent to those skilled in the art that numerous changes may be made in such details without departing from the spirit and principles of the invention.

I claim:

1. A rotor hub assembly for a rotary wing aircraft, comprising a spindle adapted to be rotated about a generally vertical spin axis and having a plurality of outwardly extending spindle shafts spaced angularly from each other and defining pitch-control axes adapted to be positioned in a generally horizontal orientation, each of said spindle shafts being equipped with a journal bearing assembly and thrust bearing assembly spaced apart axially along the associated pitch-control axis, each of said spindle shafts having a section of enlarged diameter adjacent the inner end thereof and a section of reduced diameter adjacent its outer end and being equipped with an outwardly facing inner abutment shoulder adjacent the inner end portion of said section of enlarged diameter and being equipped also with an outwardly facing outer abutment shoulder adjacent the inner end portion of said section of reduced diameter, each thrust bearing assembly being mounted upon said section of enlarged diameter of the associated spindle shaft and being constrained against axial movement therealong in an inward direction by abutment with said inner shoulder thereof, stop structure for each spindle shaft and being mounted upon the associated section of enlarged diameter thereof outwardly of the thrust bearing assembly and in substantial engagement therewith to constrain the same against axial movement in the opposite direction along the associated spindle shaft, a plurality of blade holders respectively associated with said spindle shafts in coaxial circumjacent relation therewith and being supported by the bearing assemblies thereof for pitch-determining displacements about the respectively associated pitch-control axes, each of said blade holders being provided with an inwardly facing inner shoulder in abutment with the associated thrust bearing assembly and being provided also with an inwardly facing outer shoulder in substantial abutment with the associated journal bearing assembly whereby inward movement of each such blade holder along the associated spindle shaft is limited by such abutments of the inwardly facing shoulders thereof, and a plurality of releasable fasteners respectively associated with said spindle shafts in circumjacent relation therewith and being disposed in abutment with the inner end of the thrust bearing assembly thereon and releasably secured to the associated blade holder to constrain the same against outward axial displacement along the associated spindle shaft.

2. The rotor hub assembly of claim 1 in which each of said thrust bearing assemblies comprises a bearing structure having an inner segmented race, each of said stop structures being selectively adjustable along the associated spindle shaft so as to urge the thrust bearing assembly thereof into abutment with the outwardly facing inner shoulder of such spindle shaft and provide preloading of said thrust bearing assembly in cooperation with the inner segmented race thereof.

3. The combination of claim 1 in which each of said releasable fasteners is a hollow nut threadedly engaging the associated blade holder.

4. In combination with the upwardly extending rotor column of a rotary wing aircraft, a rotor hub assembly including a spindle connected with said column so as to be rotatably driven therethrough about a generally vertical spin axis and being pivotally supported with respect to said column for teetering movements about a generally horizontal axis, said spindle being provided with a plurality of outwardly extending spindle shafts spaced angularly from each other and defining pitch-control axes having a generally horizontal disposition, each of said spindle shafts being equipped with a single journal bearing assembly and with a thrust bearing assembly spaced axially from the journal bearing assembly along the associated pitch-control axis, each of said spindle shafts having a section of enlarged diameter adjacent the inner end thereof and a section of reduced diameter adjacent its outer end and being equipped with an outwardly facing inner abutment shoulder adjacent the inner end portion of said section of enlarged diameter and being equipped also with an outwardly facing outer abutment shoulder adjacent the inner end portion of said section of reduced diameter, each of said thrust bearing assemblies including a plurality of bearing structures one of which has an inner segmented race and being mounted upon said section of enlarged diameter of the associated spindle shaft and being constrained against axial movement therealong in an inward direction by abutment with said inner shoulder thereof, stop structure selectively adjustable for each spindle shaft and being removably mounted upon the associated section of enlarged diameter thereof outwardly of the thrust bearing assembly and in substantial engagement therewith to constrain the same against axial movement in the opposite direction along the associated spindle shaft, a plurality of blade holders respectively associated with said spindle shafts in coaxial circumjacent relation therewith and being supported by the bearing assemblies thereof for pitch-determining displacements about the respectively associated pitch-control axes, each of said blade holders being provided with an inwardly facing inner shoulder in abutment with the associated thrust bearing assembly and being provided also with an inwardly facing outer shoulder in substantial abutment with the associated journal bearing assembly whereby inward movement of each such blade holder along the associated spindle shaft is limited by such abutments of the inwardly facing shoulders thereof, a plurality of releasable hollow nut fasteners respectively associated with said spindle shafts in circumjacent relation therewith and being disposed in abutment with the inner end of the thrust bearing assembly thereon and threadedly engaging the associated blade holder to constrain the same against outward axial displacement along the associated spindle shaft, and pitch-adjusting structure connected with said blade holders for effecting angular displacements thereof.

References Cited by the Examiner

UNITED STATES PATENTS

| | | | |
|---|---|---|---|
| 1,508,085 | 9/24 | Cooper | 308—189.1 |
| 1,760,876 | 6/30 | McCauley | 170—160.58 |
| 2,257,126 | 9/41 | Rindfleisch | 170—160.58 |
| 2,530,520 | 11/50 | Hackethal | 170—160.58 |
| 2,663,374 | 12/53 | Vandermeer | 170—160.26 |
| 2,759,243 | 8/56 | Smith | 308—196 X |
| 2,919,753 | 1/60 | Hook | 170—160.25 |
| 2,997,111 | 8/61 | Biermann | 170—160.58 |
| 3,119,454 | 1/64 | Leoni | 170—160.58 |

FOREIGN PATENTS

| | | |
|---|---|---|
| 546,510 | 7/42 | Great Britain. |
| 351,339 | 8/37 | Italy. |

JULIUS E. WEST, *Primary Examiner.*

ABRAM BLUM, *Examiner.*